United States Patent [19]

Durling

[11] 4,185,788

[45] Jan. 29, 1980

[54] APPARATUS FOR DISINTEGRATING FOODSTUFFS, ESPECIALLY FRUIT AND VEGETABLE FOODSTUFFS

[75] Inventor: Bengt Durling, Solna, Sweden

[73] Assignee: AB Halldemaskiner, Solna, Sweden

[21] Appl. No.: 944,547

[22] Filed: Sep. 21, 1978

[30] Foreign Application Priority Data

Sep. 27, 1977 [SE] Sweden .............................. 7710782

[51] Int. Cl.² .............................................. B02C 18/06
[52] U.S. Cl. .............................. 241/285 A; 241/169.1; 83/355; 83/444
[58] Field of Search ............... 241/285 R, 285 A, 168, 241/169, 169.1, 169.2, 199.7, 280; 83/355, 356.3, 444

[56] References Cited

U.S. PATENT DOCUMENTS

| | | | |
|---|---|---|---|
| 2,492,260 | 12/1949 | Bingham | 83/444 |
| 2,513,341 | 7/1950 | Marasco | 83/425 X |
| 3,895,548 | 7/1975 | Sauve | 241/169.2 X |

*Primary Examiner*—Richard B. Lazarus

*Attorney, Agent, or Firm*—Hammond & Littell

[57] ABSTRACT

The present invention relates to an apparatus for disintegrating foodstuffs especially fruit and vegetable foodstuffs including a casing, a spindle supported rotatably in said casing and extending axially therethrough and driven by a motor. A disintegrating member, e.g. in form of a cutting disc is connected with said spindle and there is further a feeding hopper mounted concentrically on said casing and above said cutting disc. There is a pressing member for feeding foodstuffs in direction towards said cutting disc, the inner of said hopper being provided with radially directed members forming a number of sector shaped spaces. According to the invention said hopper is provided with a number of slits for receiving a number of vertically located walls, said walls being detachably and/or rigidly arranged, the vertical, towards the center of said hopper directed parts of each of said walls extending optimally only to near the center line of a possible extension of said spindle to forming upwardly as well as in direction to the center of said hopper open sector shaped spaces.

9 Claims, 4 Drawing Figures

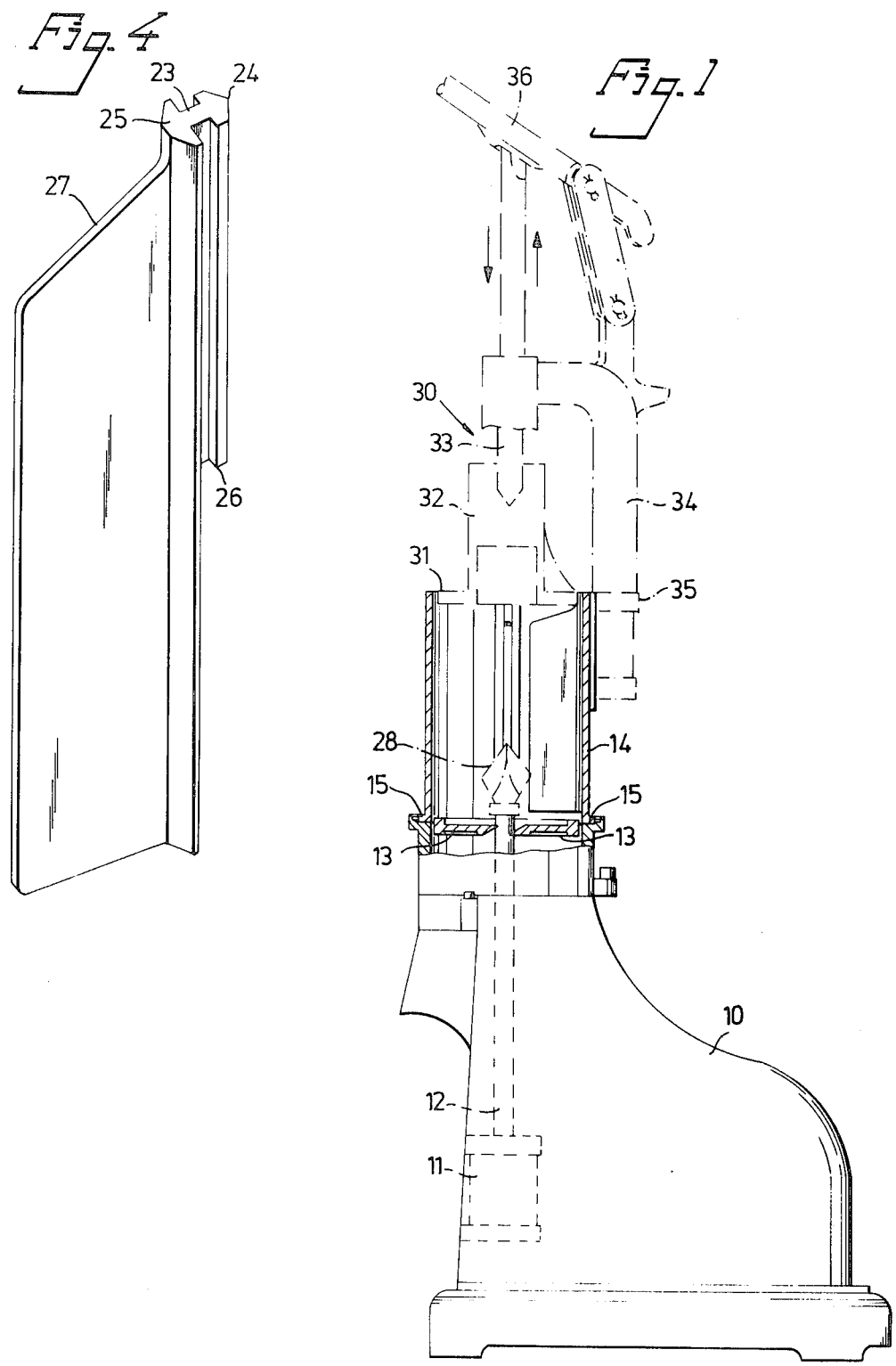

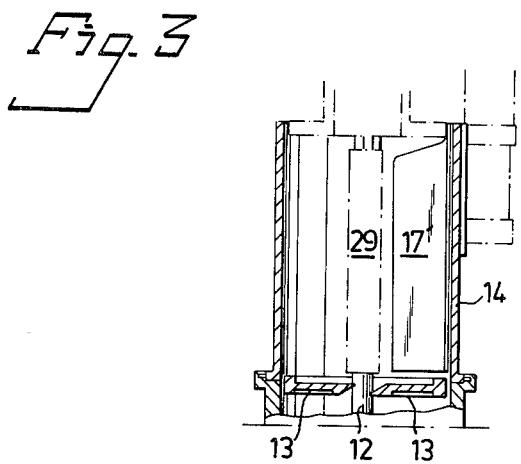
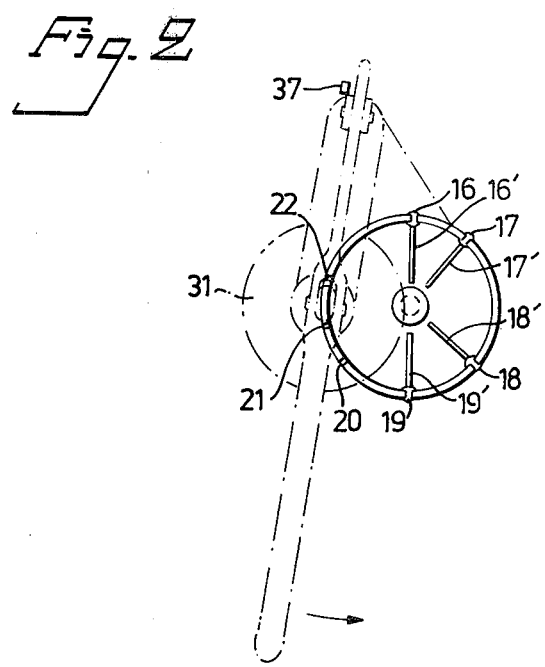

APPARATUS FOR DISINTEGRATING FOODSTUFFS, ESPECIALLY FRUIT AND VEGETABLE FOODSTUFFS

The present invention relates to a material disintegrating apparatus and is particularly concerned with an apparatus for disintegrating fruit and vegetable foodstuffs, including an casing, a spindle supported rotatably in said casing and extending axially there through and driven by a motor, a disintegrating member, e.g. in form of a cutting disc connected with said spindle, a feeding hopper mounted concentrically on said casing and above said cutting disc, a pressing member for feeding foodstuffs in direction towards said cutting disc, said hopper being provided with radially directed members forming the inner of said hopper into sectors.

U.S. Pat. No. 2,513,341 may be considered disclose an apparatus of the above kind, although said apparatus is specially designed to cut slices of lemons.

The difference in size between the same kind of foodstuffs, e.g. vegetables, is often considerable. Certain fruits and vegetables call for a manually handling in connection with the feeding down because of the structure of such foodstuffs, in order to obtain an optimal result. An example is slicing of lemons, tomtoes, onions etc., where it is essential that the seed part is correctly located relative the disintegrating member. Other foodstuffs being bigger or considerably bigger can not be disintegrated prior to manually cutting into smaller pieces to fit into the hopper.

The main object of the present invention is to provide a machine of the type defined above with means to increase its flexibility and create opportunities to increase the capacity of said machine for disintegrating especially vegetable foodstuffs.

This end other objects are attained thereby, that said hopper is provided with a number of slits for receiving a number of vertically located walls, said walls being detachably and/or rigidly arranged, the vertical, towards the center of said hopper directed part of each of said walls extending optimally only to near the centerline of a possible extension of said spindle to forming upwardly as well as in direction to the center of said hopper open sectors.

Thereby that the inner of all sectors is easily accessible from above as well as from the inside, the foodstuffs may be manually located, e.g. by stacking round or short objects, should it be necessary. By detachably arranging at least some of the walls the opportunity to increase or decrease the size of a sector or sectors is obtained which gives the apparatus a better flexibility regarding the size of foodstuffs to be received in the hopper and disintegrated by the cutting disc.

A further feature of the improved apparatus is, that the vertical, towards the center of said hopper directed part of each of said walls extend optimally to near a line, that is vertically limited by the envelope surface of a possible extension of said spindle. Such an arrangement allows that the spindle may be provided with means for facilitating and/or improving the capacity without removing the walls.

Thereby at least two of the walls may be rigidly mounted and all other walls detachibly arranged to obtaining any desired size of sectors. The rigidly mounted walls, is a sectors. The ridgidly mounted walls, is a safety measure that prevents that the operator unintentionally comes in contact with the rotating disintegrating member.

Further features of the invention will appear from the following detailed description of a preferred embodiment with reference to the annexed drawings in which FIG. 1 is a side view of the improved apparatus, with a portion broken away to show the inner of the hopper. A pressing member is shown in chain-dotted lines.

FIG. 2 is a diagrammatical top view of the hopper, a pressing member illustrated by chain-dotted lines.

FIG. 3 is shows a part of the area around the rotating disintegrating member.

FIG. 4 shows a wall in greater scale.

Referring now to the drawings, a casing 10 carries a feeding hopper 14 that is detachably arranged on the top of said casing by means of a bayonet socket 15. This detachable arrangement facilitates i.a. the cleaning of the disintegrating member 13, that may be a cutting disc.

According to the invention the hopper is along its periphery provided with slits or recesses 16, 17, 18, 19, 20, 21, 22. These slits or recesses are preferably open upwards and preferably unequally spaced. Said slits are arranged to cooperate with a number of walls of which walls 16', 17', 18', 19' are shown in FIG. 2. These walls 16'...19' are so arranged, that the vertical free side of each wall extends optimally, that is, not longer than to a centerline of a possible extension of the spindle 12, driven by a motor 11. Thereby is obtained upwards as well as in direction of the center of said hopper open, sector shaped openings.

To obtaining larger, side directed openings, the vertical, towards the center of the hopper directed part of each wall may extend optimally to near a line, that is vertically limited by the envelope surface of a possible extension of said spindle 12.

The walls 16'...19', that may be equally dimensioned, have each a shaping for cooperating with a slit, consisting of a part 23, to be received in a slit 16...19. Flanges 24, 25 secure said wall against horizontal movements and the end part 26 will bear against the bottom of each slit and thereby create a vertical stop. The walls are inserted in resp. slit from above. The upper part of a wall will be in flush or essentially in flush with the upper part of the hopper. The wall part 27 (FIG. 4) inclines down-wards-inwards towards the center of the hopper. The anchor means 23, 24, 25, 26 are identically shaped for each wall and so are the slits which means that a wall may be received in any slit.

In a preferred embodiment, at least two of said walls 16'...19' for reasons of safety are ridgidly mounted, preferably the walls 17', 18'. The location of these walls 17', 18' results in that the operator does not run any risk unintentionally coming in contact with the rotating disc 13. In this preferred embodiment, these ridgidly mounted walls 17', 18', are located within the same 180° sector. Should the ridgidly mounted walls be arranged on opposite sides, the above mentioned risk would be obvious. These ridgid walls also serve the purpose as reference points for adaption of the size of the sector shaped spaces.

The capacity of the improved apparatus is increased by the possibilities to rearrange the walls and adapt the machine to the size of the foodstuffs to be disintegrated. The detachable walls may be received in any of the slits. The number of walls, serving a machine, may obviously be less than the number of slits, since often only one type of foodstuff is object of disintegration.

The capacity flexibility of the machine may be increased further by detachably mounting a further feeding or disintegrating member, e.g. of the kind illustrated in FIG. 1 by chain-dotted lines and designated by 28, on the spindle 12. This member 28 may be used without removing the walls 16'...19'.

In the embodiment shown in FIGS. 1 and 3 the rotating disintegrating member 13 is so arranged, that disintegrating function within a certain area near the spindle 12 is not obtained. To avoid, that a very small object gets outside the cutting area of said member 13, the space between ends of the walls may be reduced by detachibly arrange a rod-like member 29 (FIG. 3) on the rotating spindle 12.

A machine of this kind, is often combined with a pressing means, that can be of any construction known per se and which is illustrated in FIG. 1 with chain-dotted lines. This pressing member 30 includes a piston 31 and a tubular part 32 connected thereto. The piston 31 is provided with a number of radially extending slots (not shown). The tubular part 32 is ridgidly connected with an upward rod 33, which is displaceable in the vertical direction in an angular arm 34, which is rotary mounted in projections 35 provided on the hopper 14. The free end of the rod 33 is hingedly connected with a lever 36. The piston may be pushed downwards and press the foodstuffs in contact with the disintegrating member 13.

This pressing member 30 may cooperate with a switch 37. When the piston has been turned a certain angle, e.g. to a position where 180° of the hopper opening is exposed, the circuit to the motor 11 is broken. Without running any risk, foodstuff may be manually fed into the left part of the 180° sector space (FIG. 2). For continuous feeding down the opposite space, divided into smaller sector, may be used. The size of the exposed opening may vary, partly depending on the size of the free sector spaces.

The pressing arrangement described above can not be used when the rod 29 (FIG. 3) is mounted on the spindle 12 but may be replaced by some other pressing- or feeding member known per se.

I claim:

1. Apparatus for disintegrating foodstuffs, especially fruit and vegetable foodstuffs, including a casing, a spindle supported rotatably in said casing and extending axially therethrough and driven by a motor, a disintegrating member, e.g. in form of a cutting disc connected with said spindle, a feeding hopper mounted concentrically on said casing and above said disintegrating member, a pressing member for feeding foodstuffs in direction towards said disintegrating member, the inner walls of said hopper being provided with radially directed members forming a number of sectors, the improvement being seen therein that said hopper is provided with a number of slits, for receiving a number of vertically located walls, said walls being detachably and/or fixedly arranged, and extending radially to near the centerline of the hopper thereby forming open sections.

2. An apparatus according to claim 1, wherein at least two of said walls are ridgidly arranged and wherein all other walls are detachibly arranged to obtaining sectors of desired size.

3. An apparatus according to claim 1 wherein all walls are detachibly arranged.

4. An apparatus according to claim 1 wherein said slits are unequally spaced from each other.

5. An apparatus according to claim 1 wherein said slits are upwardly open and that said walls may be received by said slits by introducing them from the top.

6. An apparatus according to claim 1 wherein said walls are provided with means for securing said walls in said slits.

7. An apparatus according to claim 6 wherein the upper part of each wall inclines inwards-downwards when correctly cooperating with a slit.

8. An apparatus according to claim 1 wherein said pressing member consists of a feeding piston, that is connected to a lever, said piston being movable in direction to a position at the side of said hopper, thereby actuating a member for disconnecting the current to said motor, the improvement consisting in that said rigidly mounted walls are located within the same 180° sector.

9. An apparatus according to claim 1 wherein said spindle carries a member for limiting the vertical sector openings.

* * * * *